United States Patent [19]

Leonardo

[11] 4,393,549
[45] Jul. 19, 1983

[54] SUPPORT CLIP FOR A DROPWIRE OR THE LIKE

[75] Inventor: Ignazio Leonardo, Mountainside, N.J.

[73] Assignee: Diamond Communication Products, Inc., Garwood, N.J.

[21] Appl. No.: 306,857

[22] Filed: Sep. 29, 1981

[51] Int. Cl.³ ............................................. F16G 11/02
[52] U.S. Cl. .............................. 24/115 A; 24/115 R; 24/129 B; 403/212; 403/399
[58] Field of Search ............ 24/115 R, 115 A, 115 K, 24/115 H, 119, 121, 128, 265 AL, 265 A, 265 R, 129 R, 129 B, 114.5, 16 PB, 259 R; 403/212, 369, 398, 399, 298, 299; 29/518, 519; 57/202

[56] References Cited

U.S. PATENT DOCUMENTS

| | | | |
|---|---|---|---|
| 1,496,988 | 6/1923 | Jeanblanc et al. | 24/129 B |
| 1,863,725 | 6/1932 | Lustgarten | 24/265 A |
| 1,879,991 | 9/1932 | Pratt | 24/259 R |
| 2,267,585 | 12/1941 | Churchhill | 24/265 A |
| 3,008,208 | 11/1961 | Stephen | 403/212 |
| 3,323,184 | 6/1967 | Reiter | 24/265 A |
| 3,416,197 | 12/1968 | Mark | 24/115 A |
| 3,952,376 | 4/1976 | Ellis | 24/265 AL |
| 4,036,546 | 7/1977 | Thompson et al. | 24/265 A |
| 4,059,866 | 11/1977 | Rohland | 24/115 A |

*Primary Examiner*—Gene Mancene
*Assistant Examiner*—Kris R. Schulze
*Attorney, Agent, or Firm*—Hopgood, Calimafde, Kalil, Blaustein & Judlowe

[57] ABSTRACT

The invention contemplates a unitary clip of ductile sheet metal in the form of a peripherally continuous elongate rectangular frame which is bent at its longitudinal midsection. The frame defines a window between its bent longitudinal legs, such that after inserting a loop-defining fold of cable, dropwire or the like through the window, the longitudinal ends of the frame may in a simple operation be crimped toward each other and into compressionally clamping engagement with adjacent regions of the folded cable, thereby also frictionally engaging to each other the adjacent regions of the folded cable.

6 Claims, 7 Drawing Figures

SUPPORT CLIP FOR A DROPWIRE OR THE LIKE

BACKGROUND OF THE INVENTION

The invention relates to a crimpable clip construction for use in securing a loop formed in a flexible cable, dropwire or the like, as where the secured loop is to be anchored to a bracket or other support for suspension of the cable.

To my knowledge, crimp-type fittings of the character indicated have been of two general types. U.S. Pat. No. 3,416,197 is illustrative of a first type wherein, at a looped end of a cable sling, an elongate sleeve surrounds and is crimped to clamp the butt end to the adjacent portion of the running length of the cable; the construction is such that the loop can only be formed after first threading the butt end through the sleeve, and then re-threading the butt end into the sleeve, after having defined the loop; the crimping operation occurs after the re-threading. U.S. Pat. No. 1,670,347 is illustrative of the second type, wherein an elongate U-section channel is configured to receive lapped adjacent butt-end and running-length portions of a looped cable, the sidewalls of the channel being crimped toward each other to secure the lapped portions; such crimped channel inherently lacks the peripheral integrity of a sleeve and is thus incapable of securing the loop to an equivalent degree, whether the comparison is made on the basis of unit cost, unit weight, or simplicity of the involved crimping operation.

BRIEF STATEMENT OF THE INVENTION

It is an object of the invention to provide an improved clip or fitting construction of the character indicated.

A specific object is to provide such a construction which inherently lends itself to threaded reception of a folded loop portion of cable, as in a dropwire for outdoor telephone or cable-TV connection to customer premises.

Another specific object is to meet the above objects with a construction wherein the cable need not be cut at the time of loop, thereby enabling an installer to loosely form the loop by folding at such an intermediate location along the length of the cable that while on a ladder he can visually judge and secure the correct sling length, leaving an adequate uncut cable remainder, for purposes of lead-in within the customer's premises.

A general object is to meet the above objects with structure of elemental simplicity, ease of application and clamping, and with economy and clamping efficacy.

The invention achieves the foregoing objects and other features in a single-piece clip construction, involving a peripherally continuous elongate rectangular frame-like blank cut from ductile sheet metal such as steel, the frame being bent at its longitudinal midsection. The frame defines a window between its bent longitudinal legs, and the window is sufficiently elongate, in spite of the bending, to enable ready threading of a folded loop of cable therethrough. It is then simple for an installer to engage the loop to a bracket of the like support while he judges and adjusts the cable sling, the sling being secured by crimping the longitudinal ends of the bent frame into compressionally clamping engagement with adjacent regions of the loop-defining folded cable. A pliers tool is all that is needed to set the clamp, in a single one-handed operation.

DETAILED DESCRIPTION

The invention will be illustrative described in detail, in conjunction with the accompanying drawings, in which.

Figure 1:
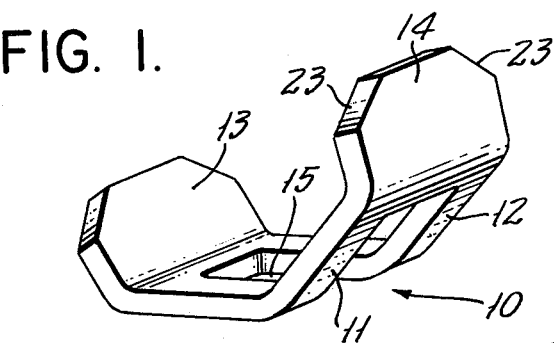
FIG. 1 is a perspective view of a crimpable clip of the invention.
Figure 2:
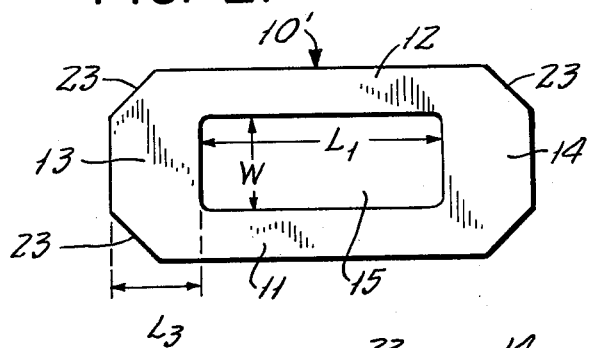
FIG. 2 is a plan view of the blank from which the clip of FIG. 1 is formed.
Figure 3:
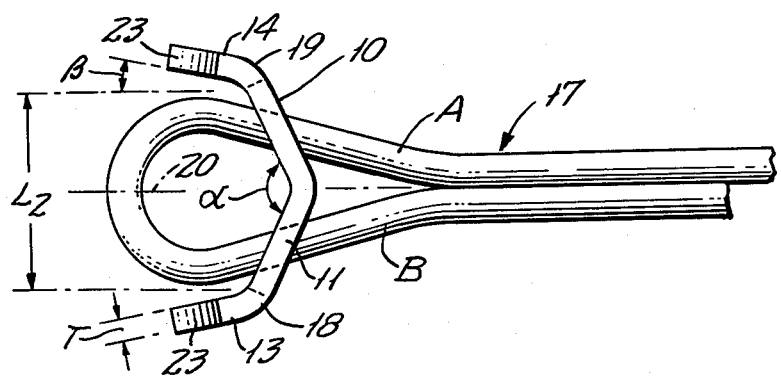
FIG. 3 is a side view of the clip of FIG. 1, in the context of an inserted loop-defining fold of cable.

Referring initially to FIGS. 1, 2 and 3, a clip 10 of the invention is seen as an obtusely bent elongate rectangular frame. The blank 10' for this frame may be stamped from ductile sheet metal such as steel. Specifically, the frame blank 10' is peripherally continuous, with spaced parallel elongate legs 11-12 and short end legs 13-14 integrally connecting the ends of legs 11-12. The frame of blank 10' continuously surrounds and defines a window opening 15 of width W and length L, wherein width W substantially corresponds with the sectional width of cable to be accommodated by clip 10.

Figure 4:
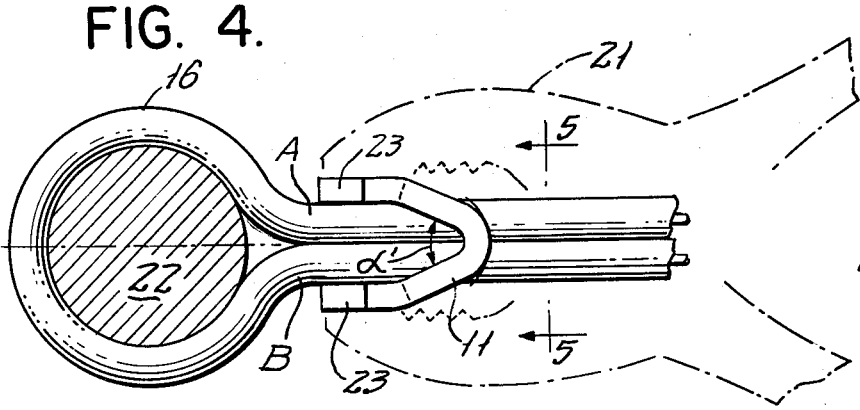
FIG. 4 is a view similar to FIG. 3 to illustrate crimp-setting of the clip.
Figure 5:
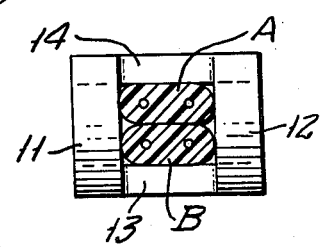
FIG. 5 is a sectional view of clamped cable, taken at 5—5 in FIG. 4.
Figure 6:
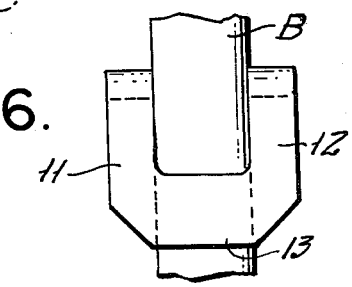
FIG. 6 is a bottom view of the crimped clamp of FIG. 4.

Clip 10 is the product of obtuse-angle bending of the elongate legs 11-12 at their longitudinal midsection. As best seen in FIG. 3, this midsection bend is at such an angle $\alpha$ as to retain an effective window length $L_2$ which is not substantially reduced from the length $L_1$ and which is adequate for easy threaded accommodation of an inserted fold 16 of cable 17 to be clamped. In addition, and preferably, the longitudinal extent $L_3$ (FIG. 2) of each of the end legs 13-14 is a multiple of the thickness T (FIG. 3) of the material from which blank 10' is cut, so that additional obtuse-angle bends 18-19 may be formed in each of the end legs 13-14. These bends 18-19 are seen to orient each of the legs 13-14 at a reduced acute angle $\beta$ to the central plane 20 of symmetry for all bending of clip 10. The angular spread $2\beta$ between the bent ends of legs 13-14 should be such as to readily adapt to the opposed open jaws of pliers used to crimp the clip to retain a fold 16 of the cable. In FIG. 4, such pliers are suggested by phantom outline 21, for the condition in which they have crimped legs 13-14 into substantially parallel squeezing relation with adjacent lapped portions A-B of the folded cable 17. In the process of crimping, the obtuse angle $\alpha$ is seen to have been permanently reduced to an acute angle $\alpha'$; but due to the fact that bends 18-19 are at regions beyond window 15 (i.e., in full clip-width material), there is a relatively stiff resistance to crimped reduction of either of the angles $\beta$, thereby assuring a firm cable-clamping bite of substantially the full longitudinal extent $L_3$ of each of the legs.

It will be seen that the described clip structure meets all stated objects. The installer need not cut his cable 17 to ultimate length before forming a loose loop 16, in fact once the loose loop 16 has been inserted through window 15 he may make substantial adjustment of loop location on the cable, thereby enabling him to position the loop for optimum sling suspension, before applying pliers to crimp; preferably, he should snub clip 10 up to the loop on its supporting fixture 22 when satisfied with the sling, so that on crimping, the retaining bind of regions A and B is close to the loop. All such operations may be readily performed while on a ladder, and cable cutting for lead-in purposes can and should be left for his return to ground level. The resulting clamped loop provides strain-relief for a dropwire or the like, whatever the nature of the bracket, plug or support to which the loop is referenced.

For more precise description of highly satisfactory clip 10, my preference is indicated for use of mild steel for blank 10'. In the specific illustrative situation of telephone dropwire cable (e.g. Western Electric C-dropwire or F-dropwire) the blank thickness is 1/16 inch, the length $L_1$ and width W of window 15 are 23/32 inch and 5/16 inch respectively, the window in the formed product 10 providing a net projected cable-loop entry window opening of 5/8 by 5/16 inch, prior to crimping; and the longitudinal extent $L_3$ of end legs 13–14 is ¼ inch, the bends 18–19 being located in the region of maximum solid-body width, i.e., longitudinally between window 15 and any chamfers or the like 23 at the outer corners of clip 10.

While the invention has been described in detail for a preferred embodiment, it will be understood that modifications may be made without departing from the scope of the invention. Further, it will be understood that with clips 10 suitably proportioned for cable size, the window opening will allow passage of further multiples of cable, as for example, the four thicknesses involved in the case of two adjacent cables 17 formed into a single loop 16, for clip-retaining purposes.

Figure 7:
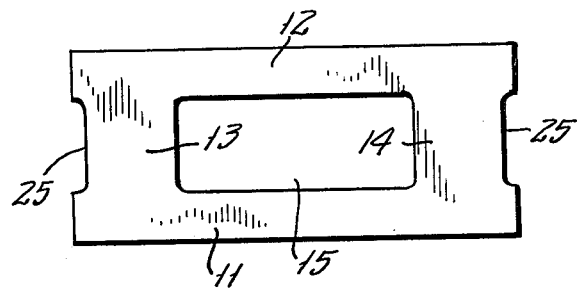
FIG. 7 is a view similar to FIG. 2 to show a modified form.

FIG. 7 illustrates a modified form of the blank from which to form a clip such as the clip 10 of FIG. 1. As will be noted, the blank of FIG. 7 differs from that of FIG. 2 in the outer-edge contour at each longitudinal end, there being a shallow recess 25 therein. Recess 25 is preferably to the window width W, for accommodation of the width of the dropwire 17. It will be understood that, when the blank of FIG. 7 is formed into a clip, as described for FIG. 1, the recess 25 will characterize the bent ends of legs 13–14, so that upon crimping the clip, the adjacent cable contour of portion A will nest and locate in recess 25 of leg 14, while the corresponding portion B will nest, thereby avoiding or reducing the chance of skewing the clip with respect to the cable in the course of crimping, or thereafter.

What is claimed is:

1. As an article of manufacture, a support clip for a dropwire or the like, comprising a formed unitary blank of ductile metal sheet, the planiform of the blank being a peripherally continuous elongate rectangular frame surrounding a central open rectangular window region, said frame comprising two elongate parallel legs and two short end legs integrally connecting the longitudinal ends of said elongate legs, the length of said elongate legs along the length of said window region being at least twice the length of said short end legs along the width of said window region, like longitudinally central obtuse-angle bends in each of said elongate legs, whereby the span between end legs is less than the length of said elongate legs but is nevertheless greater than the length of said short end legs, the width of said window being sized for accommodation of the width of dropwire to be secured to a support and said span between end legs being greater than the combined double thickness of the dropwire, whereby a loop of the dropwire may be inserted through the window within said span with portions of the dropwire on both sides of the loop in adjacency to the combined extent of double the dropwise thickness, further whereby the clip may then be secured by crimping said end legs toward each other to reduce said span and in compressed squeezing engagement with said dropwire portions to permanently retain the loop, with said longitudinally central bends permanently reduced from said obtuse angle.

2. The article of claim 1, in which said end legs are each at bent offset with respect to adjacent regions of said elongate legs.

3. The article of claim 2, in which said bent offsets are such as to orient said end legs at an acute angle with respect to each other.

4. The article of claim 1 in which said end legs are of longitudinal extent which is a multiple of the thickness of the metal blank, said bent offsets being each fully contained within the body material of the involved end leg.

5. The article of claim 1, in which the longitudinal outer-end edge of each end leg is characterized by a recess profile.

6. The article of claim 5, in which the recess profile is of lateral extent substantially coincident with the window width.

* * * * *